United States Patent Office 3,185,186
Patented May 25, 1965

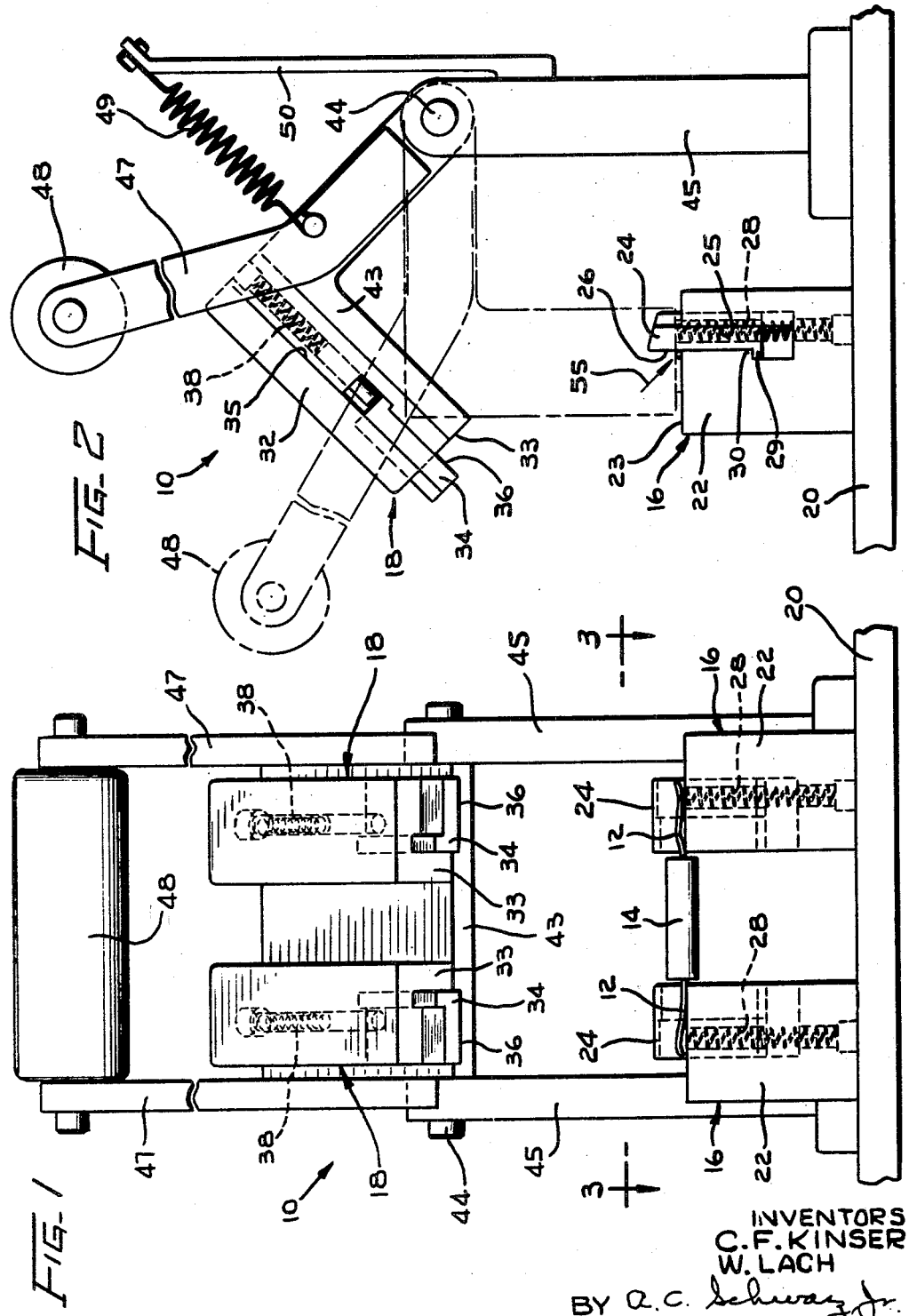

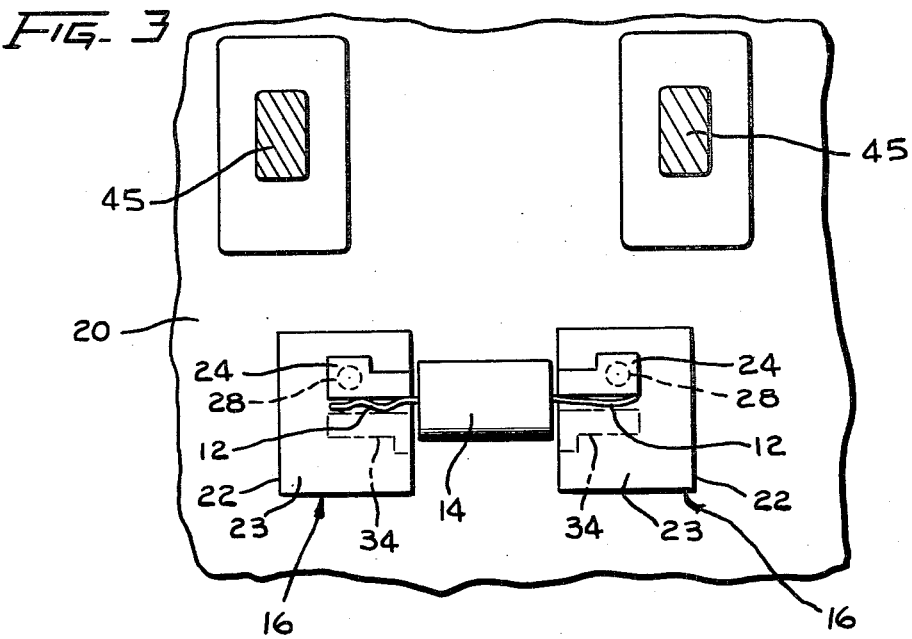
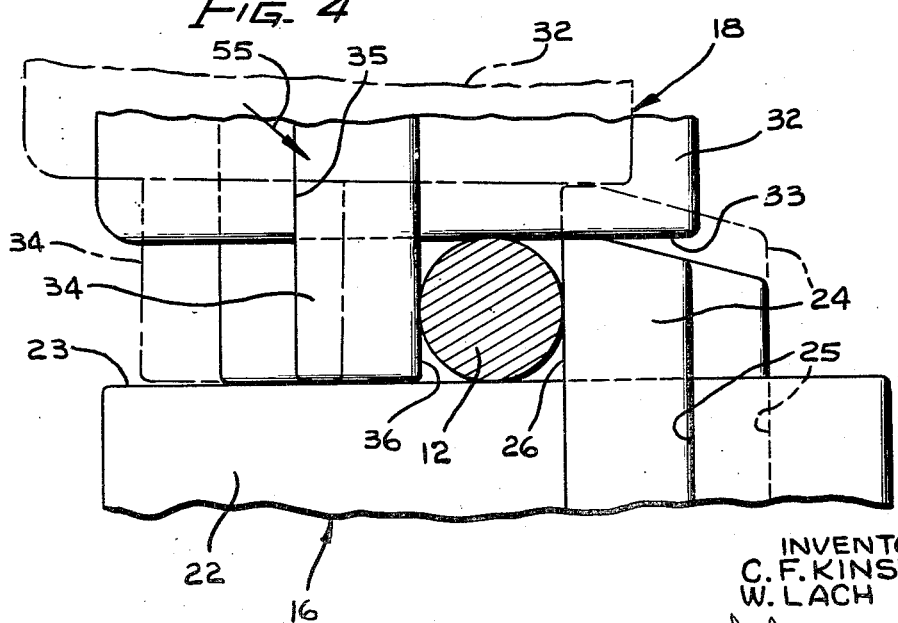

3,185,186
ARTICLE STRAIGHTENING DEVICE
Charles F. Kinser, Downers Grove, and Walter Lach, Chicago, Ill., assignors to Western Electric Company, Incorporated, New York, N.Y., a corporation of New York
Filed July 6, 1962, Ser. No. 208,064
4 Claims. (Cl. 140—147)

This invention relates to an article straightening device, and more particularly to a device for straightening bent wire leads, rods, tubes, and the like.

An object of the invention is to provide a simple and effective article straightening device.

Another object of the invention is to provide a device for straightening articles such as bent wire leads, rods, and tubes of various sizes.

A device illustrating certain aspects of the invention as related to the straightening of wire leads on electrical components may include a pair of relatively movable composite jaws. Each of the jaws include a first member provided with a flat lead-straightening surface, and a second member which is slidably mounted on the first member for movement perpendicular to the flat surface and which is spring urged to a normal extended position on the first member and has a flat lead-straightening surface that cooperates with the lead-straightening surface of the first member to form a V-shaped nest for receiving the lead therein. One of the jaws is mounted for movement into engagement with the other jaw and for limited continued movement thereafter along an oblique path of substantially 45° to the lead-straightening surfaces so that when the jaws are in engagement with each other, the first members and the second members cooperate with one another to form a tubular forming tool of square cross-section around the lead. When the movable jaw is brought into engagement with the other jaw, the extremities of the second members engage the flat surfaces of the first members of the other jaws and the second members are pushed inwardly by the first members as the movable jaw continues its advancing movement, during which continued movement the opposed members move closer to each other and press the bent lead from four sides into straightened condition.

Other objects, advantages and novel aspects of the invention will become apparent upon consideration of the following detailed description, in conjunction with the accompanying drawings, in which:

FIG. 1 is a front elevational view of the straightening device;

FIG. 2 is a side elevational view of the device showing the movable straightening jaw thereof in open position in full lines and in closed position in dotted lines;

FIG. 3 is a plan sectional view of the device taken on line 3—3 of FIG. 1; and

FIG. 4 is an enlarged fragmentary view of the two straightening jaws with a lead therebetween and showing the movable jaw in closed position in full lines and in an intermediate position in dot and dash lines.

Referring to the drawings, the present device 10 is designed to straighten a pair of bent leads 12 of a capacitor 14 and comprises two pairs of composite jaws 16 and 18 movable into and out of engagement with each other and the leads 12. The pair of composite jaws 16 are fixedly supported on a base plate 20 and each jaw includes a member 22 in the form of a block having an upper horizontally disposed flat lead-straightening surface 23 for supporting a lead 12 thereon. Each of the jaws 16 includes a second member 24 mounted in a slideway 25 in the member 22 for vertical movement and having a flat vertically disposed lead-straightening surface 26 thereon which extends upwardly from the surface 23 and cooperates therewith to form a V-shaped nest for the reception of the lead.

The movable member 24 is urged upwardly by a spring 28 to a normal position, as shown in FIG. 2, in which position it is stopped by the engagement of a laterally disposed lug 29 on the member 24 with a shoulder 30 formed on the member 22 in the slideway 25. In horizontal cross-section the member 26 is irregular in shape (FIG. 3) and conforms to the outline of the slideway 25 and is retained therein against lateral displacement.

The composite jaws 18 are similar in construction to the composite jaws 16. Each jaw 18 comprises a member 32 having a flat lead-straightening surface 33 thereon and having a second member 34 mounted for sliding movement perpendicular to the flat surface 33 in a slideway 35 in the first member 32. The movable member 34 is provided with a flat lead-straightening surface 36 which is disposed perpendicular to the surface 33 and forms a V-shaped nest therewith for receiving the wire therein during the lead-straightening operation. A spring 38 urges the member 34 to its normal extended position as shown in FIG. 2.

The pair of composite jaws 18 are secured to an L-shaped cradle 43 which is mounted for rocking movement about a pivot pin 44 supported in a pair of brackets 45 on the base plate 20. Attached to the sides of the cradle 43 is a pair of lever arms 47 with a handle 48 interconnected therebetween by means of which the jaws 18 may be moved manually to and from a normal open position as indicated in full lines in FIG. 2, and a closed position indicated in dotted lines therein. A spring 49 connected to a bracket 50 and to the cradle 43 serves to yieldably maintain the pair of movable jaws 18 in their open position.

The jaws 16 and 18 are mounted for relative movement therebetween so that as the upper jaw 18 is brought into engagement with the lower jaw 16 and continues for a limited distance thereafter, the path of movement thereof is disposed obliquely to the wire-straightening surfaces 23, 26 and 33, 36 and at an angle of substantially 45° thereto as indicated by arrows 55 in FIGS. 2 and 4. When the movable jaw 18 is brought into engagement with the stationary jaw 16, the extremities of the movable jaw members 24 and 34 engage the surfaces 23 and 33 of the jaw members 22 and 32, respectively, and the lead 12 is enclosed between the opposing pair of members 22, 32 and 24, 34. These members 22, 32 and 24, 34 cooperate with each other to form a contractile tubular forming tool around the lead with the aperture of the tool being substantially square in cross-section as indicated somewhat diagrammatically in FIG. 4. Continued closing movement of the upper jaw 18 causes the members 24 and 34 to be pushed longitudinally into the members 22 and 32 of the jaws 16 and 18, as the surface 33 of the jaw 18 approaches the surface 23 of the jaw 16, and simultaneously therewith effects the lateral movement of the jaw member 34 toward the jaw member 24. As the several jaw members move closer to each other they engage portions of the bent lead 12 and press the lead into a straightened condition, at which time movement of the upper jaw 18 is arrested.

*Operation*

To effect the straightening of a pair of leads of a capacitor 14 with the present device 10, the capacitor is placed on the device with the leads 12 resting on the surfaces 23 of the jaw members 22 in engagement with the vertical surfaces 26 of the jaw member 24. The handle 48 is then pulled down to effect the movement of the upper jaw 18 into engagement with the lower jaw 16 thereby enclosing the lead with the jaw members 22, 24 and 32, 34. Continued movement of the handle 48 causes the jaw members 32 and 34 to move toward the jaw members 22 and 24, respectively, and to press the lead 12 therebetween into straightened condition, at which time the movement of the upper jaw is arrested thereby. The jaw 18 is then raised to its upper position and capacitor 14 is removed from the device.

It is to be pointed out that this device is adapted to straighten leads of various diameters and that the jaw members 22, 24 and 32, 34 automatically adjust themselves to the thickness of the leads to be straightened.

If desired, the device may be modified to dispose the jaws 16 and 18 one above the other for relative vertical movement therebetween and with the wire-straightening surfaces 23, 26 and 33, 36 disposed obliquely at an angle of 45° to the horizontal.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A device for straightening an elongated article comprising:
    a pair of composite jaws, each composite jaw having a first member provided with a first flat article-straightening surface, and having a second member slidably mounted on said first member for movement transversely of said first flat surface and provided with a second flat article-straightening surface cooperating with said first surface to form a V-shaped nest for receiving an elongated bent article;
    resilient means on said jaws for urging said second members to normal extended positions on said first members; and
    means for effecting relative movement between said composite jaws to a closed position in engagement with each other and for continued movement thereafter along a path obliquely to said article-straightening surfaces and in a predetermined relation to each other so that as said composite jaws come into engagement with each other, the extremities of said second members engage the first flat surfaces of said first members of the opposite jaws and in response to continued movement therebetween are pushed inwardly thereby, and the several members cooperate with one another to form a tubular enclosure of substantially equilateral cross-section about the article with said first members and said second members respectively being in opposed relation to and movable toward each other to press the bent article into straightened condition.

2. A device for straightening an elongated bent article comprising:
    a pair of composite jaws, each composite jaw having a first member provided with a first flat article-straightening surface, and having a second member slidably mounted on said first member for movement perpendicular to said first flat surface and provided with a second flat article-straightening surface disposed at right angles to said first surface and cooperating with said first surface to form a V-shaped nest for receiving the bent article;
    resilient means on said jaws for urging said second members to normal extended positions on said first members; and
    means for effecting relative movement between said composite jaws into engagement with each other and for continued movement thereafter along a path disposed at an angle of substantially 45° to said first and second surfaces and in a predetermined relation to each other so that as said composite jaws are moved into engagement with each other, the extremities of said second members engage the flat surfaces of said first members of the opposite jaws and are pushed inwardly thereby in response to continued relative movement between said jaws and said first and said second members cooperate with one another to form a tubular enclosure of substantially square cross-section about the article with said first members and said second members respectively being in opposed relation to and movable toward each other to press the bent article into straightened condition.

3. A device for straightening an elongated bent article comprising:
    a first composite jaw;
    a second composite jaw;
    each of said composite jaws including a first member provided with a first flat surface, and a second member slidably mounted on said member for movement transversely of said first surface and provided with a second flat surface cooperable with said first flat surface to form a V-shaped nest for receiving the article therein;
    means on said jaws for urging said second members to normal extended positions on said first members;
    mounting means for fixedly supporting said first composite jaw and for supporting said second composite jaw in a predetermined relation to said first composite jaw for movement into engagement therewith and for limited continued movement relative thereto in a direction obliquely to said flat surfaces so that as the second composite jaw engages the first composite jaw, the extremities of said second members engage said first members of the opposite composite jaw and are pushed inwardly thereby in response to continued movement of said second jaw, and said members cooperate with one another to form a tubular enclosure of substantially equilateral cross-section about the article with said first members and said second members, respectively, being in opposed relation to and movable toward each other to press the bent article into straightened condition; and
    means for actuating said second jaw.

4. A device for straightening an elongated article comprising:
    a first composite jaw;
    a second composite jaw;
    each of said composite jaws having a first member provided with a first flat article-straightening surface, and a second member slidably mounted on said first member for movement perpendicular to said first surface and provided with a second flat article-straightening surface cooperable with said first surface to form a V-shaped nest for receiving the article therein;
    means on said jaws for urging said second members to normal extended positions on said first members;
    mounting means for fixedly supporting said first composite jaw with said first surface thereof disposed horizontally and with said second member extending vertically upwardly therefrom and for pivotally supporting said second composite jaw in a predetermined relation to said first composite jaw for movement into engagement with said first jaw and for continued movement thereafter in a direction obliquely to said flat surfaces so that as the second composite jaw is moved into engagement with the first composite jaw, the extremities of the second members engage the first members of the opposite composite jaw and are pushed inwardly thereby in response to continued movement of the second jaw, and said members cooperate with one another to form a tubular enclosure of substantially square cross-section about the article and with the first members and the second members, respectively, being disposed in opposed relation to and movable toward each other to press the bent article into straightened condition; and means for actuating said second jaw.

References Cited by the Examiner
UNITED STATES PATENTS

| | | | |
|---|---|---|---|
| 2,847,053 | 8/58 | Hardman | 153—21 |
| 2,920,661 | 1/60 | Drukker | 140—147 |

CHARLES W. LANHAM, *Primary Examiner.*

KINGSLEY C. PECK, *Examiner.*